US012586338B2

(12) United States Patent
    Ogawa

(10) Patent No.:     US 12,586,338 B2
(45) Date of Patent:        Mar. 24, 2026

(54) SYSTEM FOR UPDATING NEURAL NETWORK PARAMETERS BASED ON OBJECT DETECTION AREA OVERLAP SCORE

(71) Applicant: CANON KABUSHIKI KAISHA, Tokyo (JP)

(72) Inventor: Shuhei Ogawa, Kanagawa (JP)

(73) Assignee: Canon Kabushiki Kaisha, Tokyo (JP)

( * ) Notice:    Subject to any disclaimer, the term of this patent is extended or adjusted under 35 U.S.C. 154(b) by 573 days.

(21) Appl. No.: 17/935,437

(22) Filed:    Sep. 26, 2022

(65)            Prior Publication Data

US 2023/0095985 A1      Mar. 30, 2023

(30)       Foreign Application Priority Data

Sep. 28, 2021    (JP) ................................. 2021-158440

(51) Int. Cl.
    *G06K 9/00*          (2022.01)
    *G06T 7/70*          (2017.01)
                (Continued)
(52) U.S. Cl.
    CPC ................ *G06V 10/16* (2022.01); *G06T 7/70* (2017.01); *G06V 10/25* (2022.01); *G06V 10/255* (2022.01)
(58) Field of Classification Search
    CPC ...... G06V 10/255; G06V 10/16; G06V 10/25; G06V 10/22; G06V 10/82; G06V 40/103;
                (Continued)

(56)            References Cited

U.S. PATENT DOCUMENTS 10,410,120  B1 *   9/2019   Kim ..................... G06V 10/454
    2019/0130189  A1 *   5/2019   Zhou .................. G06V 10/7515
                (Continued)

FOREIGN PATENT DOCUMENTS

JP        2020119522 A     8/2020
    WO        2019142243 A1    7/2019

OTHER PUBLICATIONS

Shaoqing Ren, et al., Faster R-CNN: Towards Real-Time Object Detection with Region Proposal Networks, arXiv:1506.01497v3 [cs.CV] , https://doi.org/10.48550/arXiv.1506.01497.

*Primary Examiner* — Gregory A Morse
*Assistant Examiner* — Owais Iqbal Memon
(74) *Attorney, Agent, or Firm* — Canon U.S.A., Inc. IP Division

(57)            ABSTRACT

An information processing apparatus configured to learn objectness of an object in an image includes an image acquisition unit configured to acquire an image, a GT data acquisition unit configured to acquire GT data including at least an object area where an object present in the acquired image is present, an inference unit configured to infer a candidate area for the object in the image and a first score indicating objectness for the candidate area based on a learning model, a determination unit configured to determine a second score indicating objectness for the object area based on the inferred candidate area and an area included in the acquired GT data, and an update unit configured to update a parameter for the learning model based on a loss value calculated based on the second score and the inferred first score indicating the objectness for the candidate area.

10 Claims, 8 Drawing Sheets

701

(51) Int. Cl.
G06V 10/10 (2022.01)
G06V 10/20 (2022.01)
G06V 10/25 (2022.01)

(58) Field of Classification Search
CPC . G06T 2207/30196; G06T 2207/30248; G06T
7/70; G06T 2207/20081; G06T
2207/20084; G06T 7/73
See application file for complete search history.

(56) References Cited

U.S. PATENT DOCUMENTS

2020/0066036 A1* 2/2020 Choi ..................... G06N 3/084
2020/0356812 A1* 11/2020 Oleynik ............... H04N 13/246

* cited by examiner

2

INPUT IMAGE AND GT

OBJECTNESS AND BOUNDING BOX INFERRED AT EACH ANCHOR

INFERRED BOUNDING BOX PARAMETERS

SYSTEM FOR UPDATING NEURAL NETWORK PARAMETERS BASED ON OBJECT DETECTION AREA OVERLAP SCORE

BACKGROUND OF THE DISCLOSURE

Field of the Disclosure

The present disclosure relates to learning with a learning model to infer a position of an object in an image.

Description of the Related Art

With the recent advancement in machine learning techniques including deep learning, image recognition, voice recognition, and machine translation have been rapidly developed. Particularly, in the field of object detection to infer the position and shape of an object in an image, the detection accuracy has been drastically enhanced due to the development of a convolution neural network (CNN). Ren et al, "Faster R-CNN: Towards Real-Time Object Detection with Region Proposal Network", Neural Information Processing Systems (NIPS), 2015 discuss an example of object detection using a CNN. In Faster R-CNN, a mechanism for inferring an object candidate position, which is called a region proposal network (RPN), is used to determine the objectness of an object at each of anchors set in a lattice shape within an image. At the anchors, rectangular anchor boxes with various sizes and aspect ratios are set about the respective anchors. Learning processing is performed based on Intersection of Union (IoU) indicating the degree of overlap between an anchor box and a bounding box corresponding to a true value Ground Truth (GT). An anchor box having high IoU with the true value is learned as an object with a high objectness, while an anchor box with a low IoU is learned as a background. Regression learning is further performed on the anchor box learned as an object with high objectness so as to approximate the shape of the anchor box to the bounding box corresponding to the true value. Ren et al, "Faster R-CNN: Towards Real-Time Object Detection with Region Proposal Network", NIPS, 2015 discuss a technique for learning the value of centerness in which a value is increased toward the center of a rectangular bounding box surrounding an object. In inference processing, an area with high centerness is determined to be an area with high objectness. Japanese Patent Application Laid-Open No. 2020-119522 relates to an invention made by applying Faster R-CNN and discusses a technique for learning and inferring objectness of an object by a region proposal network (RPN), like in Faster R-CNN.

In the technique discussed in Japanese Patent Application Laid-Open No. 2020-119522, the objectness is learned by RPN. As described above, learning by the RPN is performed based on the IoU between an anchor box set at each anchor and a bounding box corresponding to a true value. In this case, the anchor box is set at the center of the corresponding anchor. In a case where there are anchor boxes having the same size and the same aspect ratio, the anchor box including an anchor closer to the center of the bounding box corresponding to GT has higher IoU with the bounding box corresponding to GT. Accordingly, an anchor closer to the center of an object can be learned as an object with higher objectness.

On the other hand, the degree of overlap between the bounding box regression processing result for the anchor box including an anchor closer to the center of the object and the bounding box corresponding to GT is not always high. This is because it is unlikely that the anchor based on the accurate bounding-box regression result can be always learned as the object with high objectness, and objectness learning and bounding-box regression learning are performed independently.

SUMMARY OF THE DISCLOSURE

The present disclosure has been made in view of the above-described circumstances and is directed to enhancing the inference accuracy of a learning model to infer an area where an object is present in an image.

According to an aspect of the present disclosure, an information processing apparatus configured to learn objectness of an object in an image includes an image acquisition unit configured to acquire an image, a GT data acquisition unit configured to acquire GT data including at least an object area where an object present in the acquired image is present, an inference unit configured to infer a candidate area for the object in the image and a first score indicating objectness for the candidate area based on a learning model, a determination unit configured to determine a second score indicating objectness for the object area based on the inferred candidate area and an area included in the acquired GT data, and an update unit configured to update a parameter for the learning model based on a loss value calculated based on the second score and the inferred first score indicating the objectness for the candidate area.

Further features of the present disclosure will become apparent from the following description of exemplary embodiments with reference to the attached drawings.

BRIEF DESCRIPTION OF THE DRAWINGS

FIGS. 7A and 7B illustrate an example of an acquired template image and a search range image.

DESCRIPTION OF THE EMBODIMENTS

<Detection Task Learning>

Figure 1:
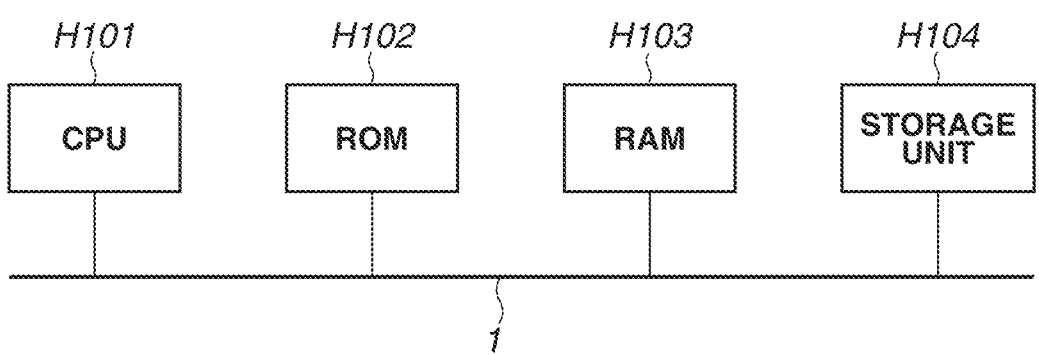
FIG. 1 is a configuration diagram illustrating a hardware configuration example of an information processing apparatus according to a first exemplary embodiment.

An information processing apparatus according to a first exemplary embodiment of the present disclosure will be described with reference to the drawings. Assume that components denoted by the same reference numerals in the drawings operate in a similar manner, and thus redundant descriptions are omitted. Components described in the present exemplary embodiment are merely examples and are not intended to limit the scope of the present disclosure.

The present exemplary embodiment illustrates a technique for learning an object detection task to detect the position and shape of an object in an image.

FIG. 1 is a configuration diagram illustrating a hardware configuration example of an information processing apparatus 1 configured to perform learning of an object detector according to the present exemplary embodiment. A central processing unit (CPU) H101 executes control programs stored in a read-only memory (ROM) H102 to thereby control the entire information processing apparatus. A random access memory (RAM) H103 temporarily stores various data supplied from each component. Programs are loaded into the RAM H103 so that the programs can be executed by the CPU H101.

A storage unit H104 is configured to store data to be processed according to the present exemplary embodiment, and stores data used for learning. As media for the storage unit H104, a hard disk drive (HDD), a flash memory, and various optical media can be used.

Figure 2:
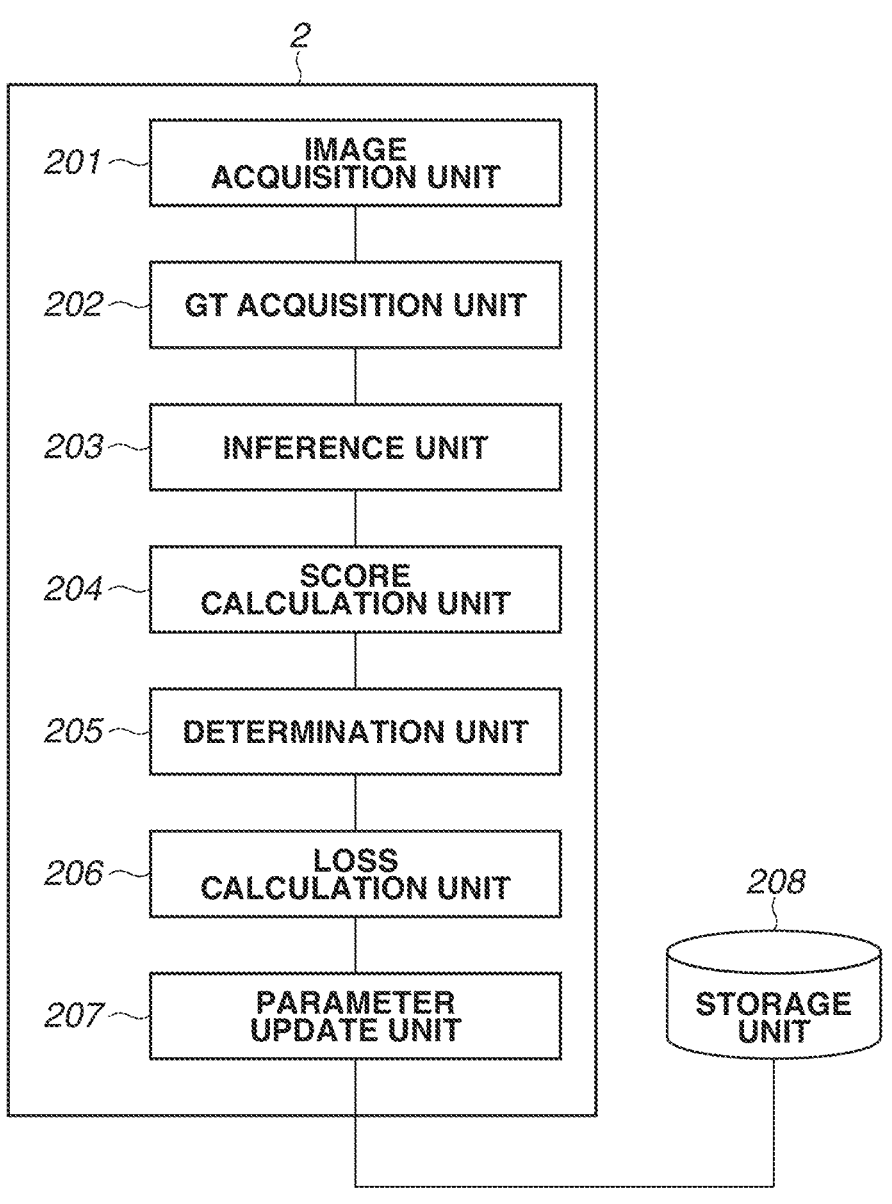
FIG. 2 is a block diagram illustrating a functional configuration example of the information processing apparatus.

FIG. 2 is a block diagram illustrating a functional configuration example of the information processing apparatus 1. The information processing apparatus 1 is used to learn a task for detecting an object from an image. The information processing apparatus 1 includes an image acquisition unit 201, a Ground Truth (GT) acquisition unit 202, an inference unit 203, a score calculation unit 204, a determination unit 205, a loss calculation unit 206, and a parameter update unit 207. These constituent units are each connected to a storage unit 208. The storage unit 208 may be included in the information processing apparatus 1. The functional constituent units will be briefly described below.

The image acquisition unit 201 acquires an image stored in the storage unit 208. The image includes an object to be detected, such as a person or a vehicle. The image acquisition unit 201 may acquire an image captured by an image capturing apparatus. The GT acquisition unit 202 acquires correct answer data (GT) including the position and size of an object present in the image acquired by the image acquisition unit 201 from the storage unit 208. Specifically, GT includes an image prepared for learning, and a bounding box (e.g., a rectangular area) indicating the position and size of the object and a label indicating the category (class) of the object are preliminarily added to the image. An object area where the bounding box is designated can be an area where it is highly likely that some object is present regardless of the category of the object and it is estimated that a score for objectness is high. However, the GT generation method is not limited to this example.

Figure 8:
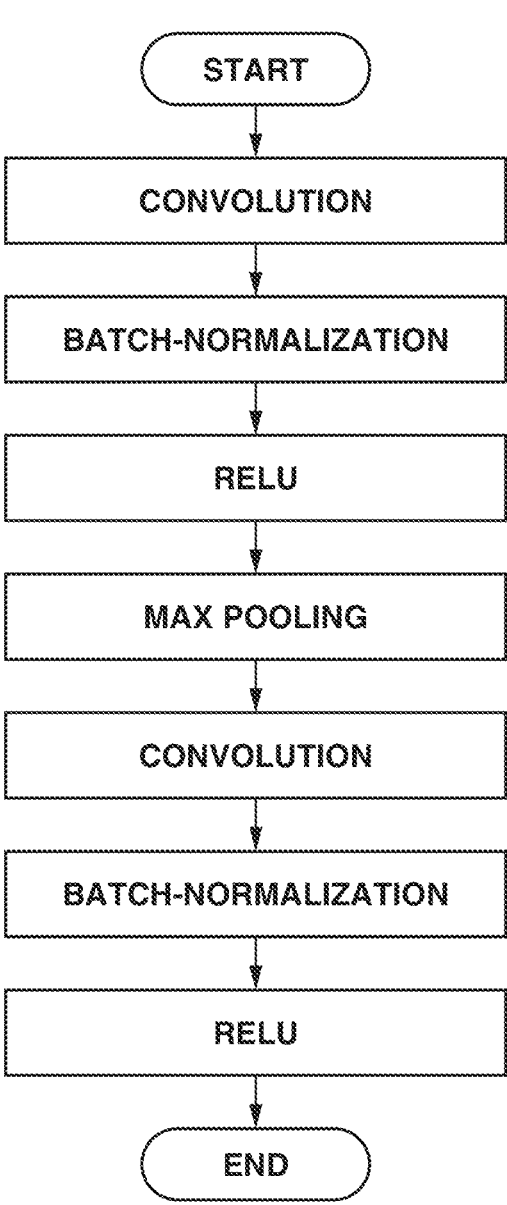
FIG. 8 illustrates an example of a convolution neural network (CNN).

The inference unit 203 inputs the image acquired by the image acquisition unit 201 to a neural network and obtains a candidate area (bounding box) indicating the possibility of presence of the object in the image as the inference result and a score (first score) indicating objectness for the candidate area. As illustrated in FIG. 8, the neural network includes convolution, Batch-Normalization, and Rectified Linear Unit (ReLU). A configuration example illustrated in FIG. 8 is merely an example. For example, Leaky ReLU or a sigmoid function may be used instead of ReLU, and Max Pooling and Average Pooling may be used in combination. The present exemplary embodiment is not intended to limit these. As the infer result, objectness and a bounding box indicating the shape of an object are obtained. A bounding box is set at each of anchor points that are set at the respective coordinates of a target image.

The score calculation unit 204 calculates a score (second score) indicating an object shape inferred based on the object shape (candidate area) obtained as the inference result from the inference unit 203 and the object shape (correct answer data) corresponding to a true value acquired by the GT acquisition unit 202.

The determination unit 205 determines GT for objectness (a new correct answer area in the target image and a score indicating objectness) based on the score obtained by the score calculation unit 204. As described in detail below, the bounding box where the score for the inferred object shape is greater than those of peripheral bounding boxes (greater than or equal to a predetermined value) is determined to be an area of interest, and the score for the inferred object shape in the area of interest and the area of interest are treated as GT for the target image. The loss calculation unit 206 calculates a loss based on the objectness obtained as the inference result from the inference unit 203 and the GT obtained by the determination unit 205. The parameter update unit 207 updates parameters for the neural network based on the loss obtained by the loss calculation unit 206, and stores the updated parameters into the storage unit 208.

Figure 3:
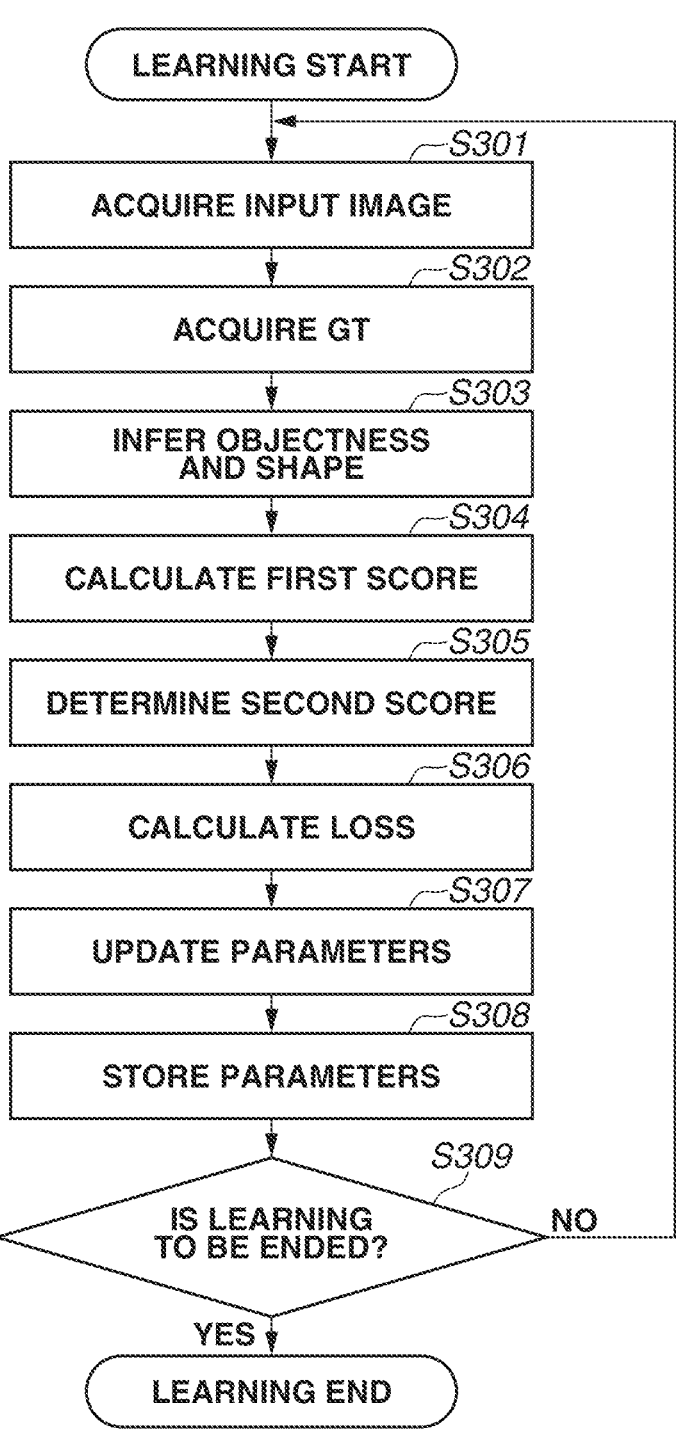
FIG. 3 is a flowchart illustrating a processing procedure to be executed by the information processing apparatus.

FIG. 3 is a flowchart illustrating a series of processes of object detection learning processing according to the present exemplary embodiment. The information processing apparatus need not necessarily perform all steps described in this flowchart. Each process to be executed by the CPU H101 is represented as a functional block.

In step S301, the image acquisition unit 201 acquires an input image stored in the storage unit 208.

Figures 7A, 7B:
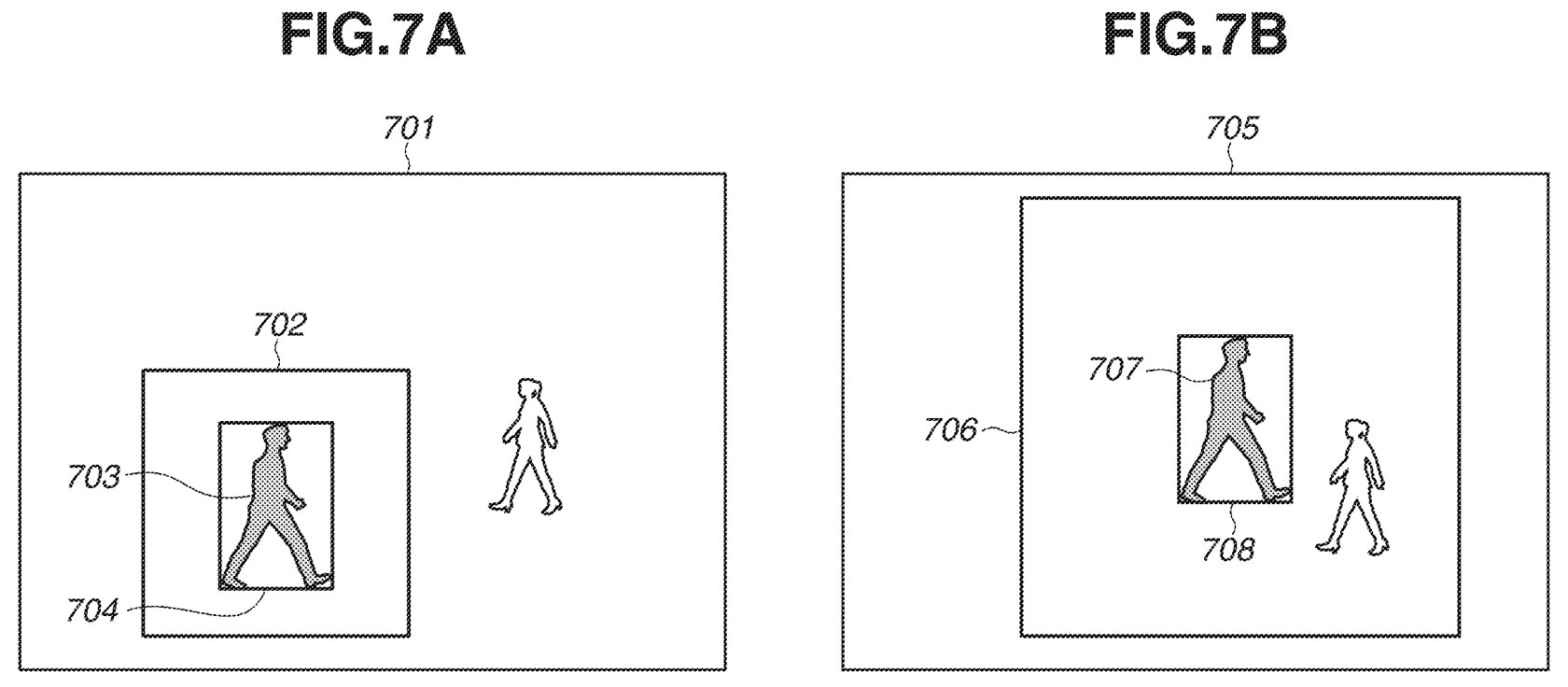

FIG. 7A illustrates an example of the input image. The input image includes an object to be detected.

Figure 4A:
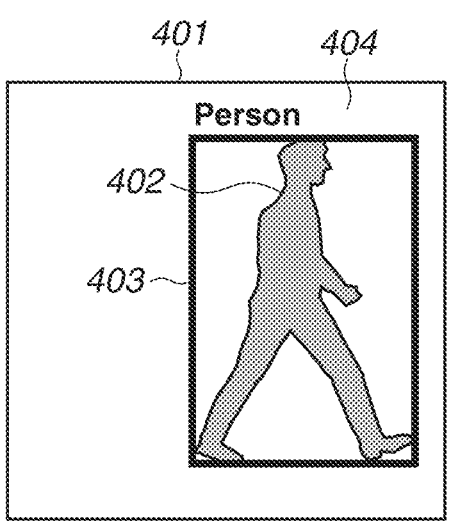
FIGS. 4A to 4C each illustrate objectness and an object shape output by an inference unit.

In step S302, the GT acquisition unit 202 acquires GT as correct answer data stored in the storage unit 208. As illustrated in FIG. 4A, GT includes a bounding box shape 403 and a label 404 for an object 402 to be detected. In this case, the object to be detected is a person, and GT includes a label and a bonding box for the person.

Figure 4B:
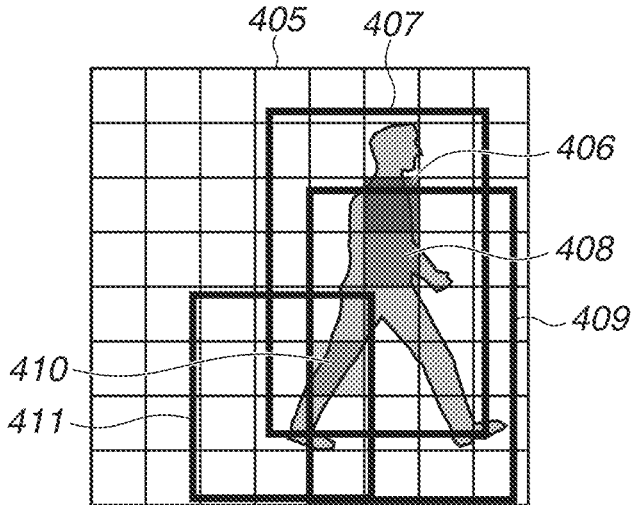

In step S303, the inference unit 203 infers the objectness, label, and shape. In this case, the shape to be inferred corresponds to a rectangular bounding box surrounding the object. FIG. 4B illustrates bounding boxes inferred at some of anchor points. Each lattice 405 indicates an anchor. FIG. 4B also illustrates anchors 406, 408, and 410, a bounding box 407 inferred at the anchor 406, a bounding box 409 inferred at the anchor 408, and a bounding box 411 inferred at the anchor 410. The anchors 406, 408, and 410 are filled-in areas depending on the inferred objectness value. A darker color indicates that the inferred objectness is higher.

Figure 4C:
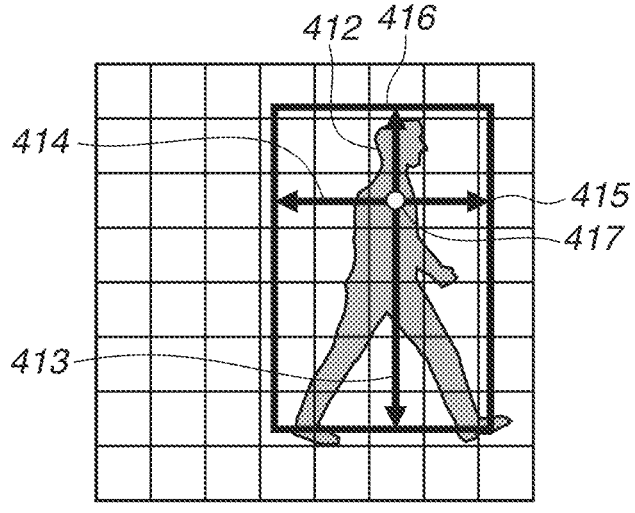

FIG. 4C illustrates parameters for the inferred bounding box.

Distances 412 and 413 from an upper end to a lower end of the bounding box and distances 414 and 415 from a left end to a right end of the bounding box are inferred based on an anchor point 417. The parameters for the bounding box to be inferred are not limited to the above-described examples. The horizontal and vertical size of the bounding box and a displacement to the center of the bounding box may be inferred. Additionally, any shape other than a rectangular shape such as a bounding box may be inferred. For example, a circular shape may be inferred. The present exemplary embodiment is not intended to limit these shapes.

In step S304, the score calculation unit 204 calculates, for each anchor, a score as an index for objectness based on $BB_{pred}$ representing the object shape inferred by the inference unit 203 and $BB_{GT}$ representing GT acquired by the GT acquisition unit 202. Specifically, Expression (1-1) is used to determine the score based on a degree of overlap, that is, Intersection of Union (IoU) between $BB_{pred}$ and $BB_{GT}$.

$$Score_{objectness} = IoU(BB_{pred}, BB_{GT}) \qquad (1\text{-}1)$$

Figure 5:
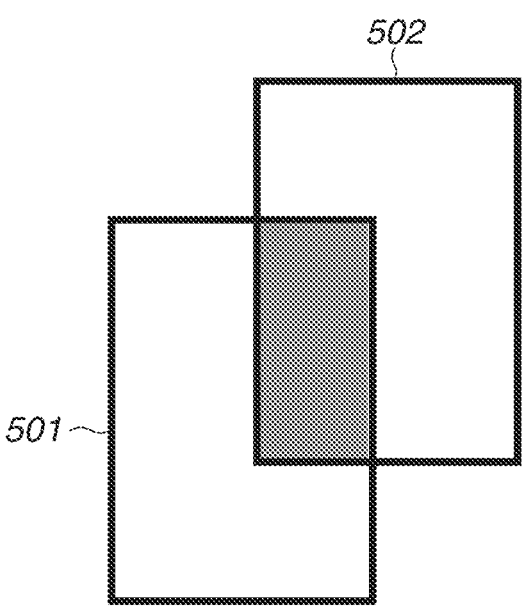
FIG. 5 illustrates an example of Intersection of Union (IoU).

As illustrated in FIG. 5, in a case where two bounding boxes 501 and 502 are present, IoU is calculated based on the common set and sum-set of the two bounding boxes as represented by the following Expression (1-2). The IoU has a range of [0, 1], and a higher degree of overlap between the bounding boxes indicates a higher value.

$$IoU(BB_1, BB_2) = \frac{BB_1 \cap BB_2}{BB_1 \cup BB_2} \qquad (1-2)$$

In step S305, the determination unit 205 determines GT for objectness as represented by the following Expression (1-3) based on the score for the inferred object shape obtained by the score calculation unit 204.

$$Objectives_{GT} = \begin{cases} Score_{objectives} & if \ Score_{objectives} > Threshold \\ 0 & else \end{cases} \qquad (1-3)$$

In Expression (1-3), Threshold represents a threshold for the score for objectness. In a case where the score is lower than the threshold, GT for objectness is "0", which indicates that the shape does not match the object.

In step S306, the loss calculation unit 306 calculates a loss for objectness and a loss for bounding-box regression. First, the loss is calculated by Expression (1-4) based on the objectness obtained by the inference unit 203 and the objectness obtained by the determination unit 205.

$$Loss_{objectness} = \frac{1}{N} \sum \left( Objectness_{pred} - Objectness_{gt} \right)^2 \qquad (1-4)$$

In Expression (1-14), N represents the number of all anchors. As a result of calculating the sum squared error as described above, in a case where the value of $Objectness_{pred}$ output from the neural network deviates from the value $Objectness_{GT}$ for GT, the loss increases, and in a case where the value $Objectness_{pred}$ and the value $Objectness_{GT}$ are close to each other, the loss decreases.

The loss function is not limited to the above-described sum squared error. Any loss function such as cross-entropy may be used. The above-described loss is calculated based on all anchors, but instead may be calculated based only on some of the anchors. For example, the loss may be calculated based only on anchors at which $Objectness_{GT}$ is greater than a predetermined value and anchors at which $Objectness_{GT}$ is less than or equal to the predetermined value. An IoU loss is calculated as a loss for bounding-box regression as represented by Expression (1-5).

$$Loss_{BB} = \frac{1}{N} \sum 1 - IoU(BB_{pred}, BB_{GT}) \qquad (1-5)$$

In Expression (1-5), $BB_{pred}$ represents the inferred bounding box, and $BB_{GT}$ represents the bounding box corresponding to GT. The loss increases as the degree of overlap between the two bounding boxes decreases, and the loss decreases as the degree of overlap between the two bounding boxes increases. The loss function is not limited to the above-described IoU loss. Any loss function such as Smooth-L1 may be used. Lastly, the sum of the loss for objectness and the loss for bounding-box regression is calculated as an integrated loss.

$$Loss = Loss_{objectness} + \lambda Loss_{BB} \qquad (1-6)$$

In Expression (1-6), $\lambda$ represents a coefficient for balancing the loss for objectness with the loss for bounding-box regression and is experimentally determined.

In step S307, the parameter update unit 207 updates parameters based on the loss calculated in step S306. The parameter update processing is performed based on a back propagation method using Momentum Stochastic Gradient Descent (SGD) or the like. While the present exemplary embodiment described above illustrates an example where a loss function is output for one image, in actual learning processing, the loss value represented by Expression (1-6) is calculated for various images. The parameters for the neural network are updated such that each loss value for various images is smaller than a predetermined threshold.

In step S308, the storage unit 208 stores the parameters for the neural network updated by the parameter update unit 207.

In step S309, the parameter update unit 207 determines whether to terminate the learning processing. In the determination as to whether to terminate the learning processing, it may be determined to terminate the learning processing when the loss value obtained by Expression (1-6) is smaller than the predetermined threshold, or when a predetermined number of learning processes are completed.

The GT for objectness is determined based on the score obtained based on the degree of overlap between the inferred bounding box and the bounding box corresponding to GT as represented by Expression (1-1), thereby enabling learning such that the objectness increases at an anchor with a higher degree of overlap with GT for the inferred bounding box and the objectness decreases at an anchor with a lower degree of overlap with GT for the inferred bounding box. Consequently, in a case where an anchor with higher objectness can be inferred as the object during inference processing, a bounding box with a higher degree of overlap with GT can be obtained, which leads to an enhancement of the accuracy of bounding box inference processing.

In other words, the information processing apparatus 1 according to the present exemplary embodiment determines a candidate area with a highest score indicating the highest objectness from among a plurality of candidate areas where an object area (correct answer area) and a score indicating objectness preliminarily added to the target image to be learned are inferred based on a learning model, as a new correct answer area and a score for the correct answer area. The learning model is caused to learn the determined correct answer data, thereby making it possible to more effectively learn an object detector.

In a second exemplary embodiment, a method for learning objectness of a tracking target in an object tracking task to detect a specific tracking target in an image.

In the present exemplary embodiment, a tracking task is learned according to a technique discussed by Bertinetto, et al., "Fully-Convolutional Siamese Networks for Object Tracking".

Figure 6:
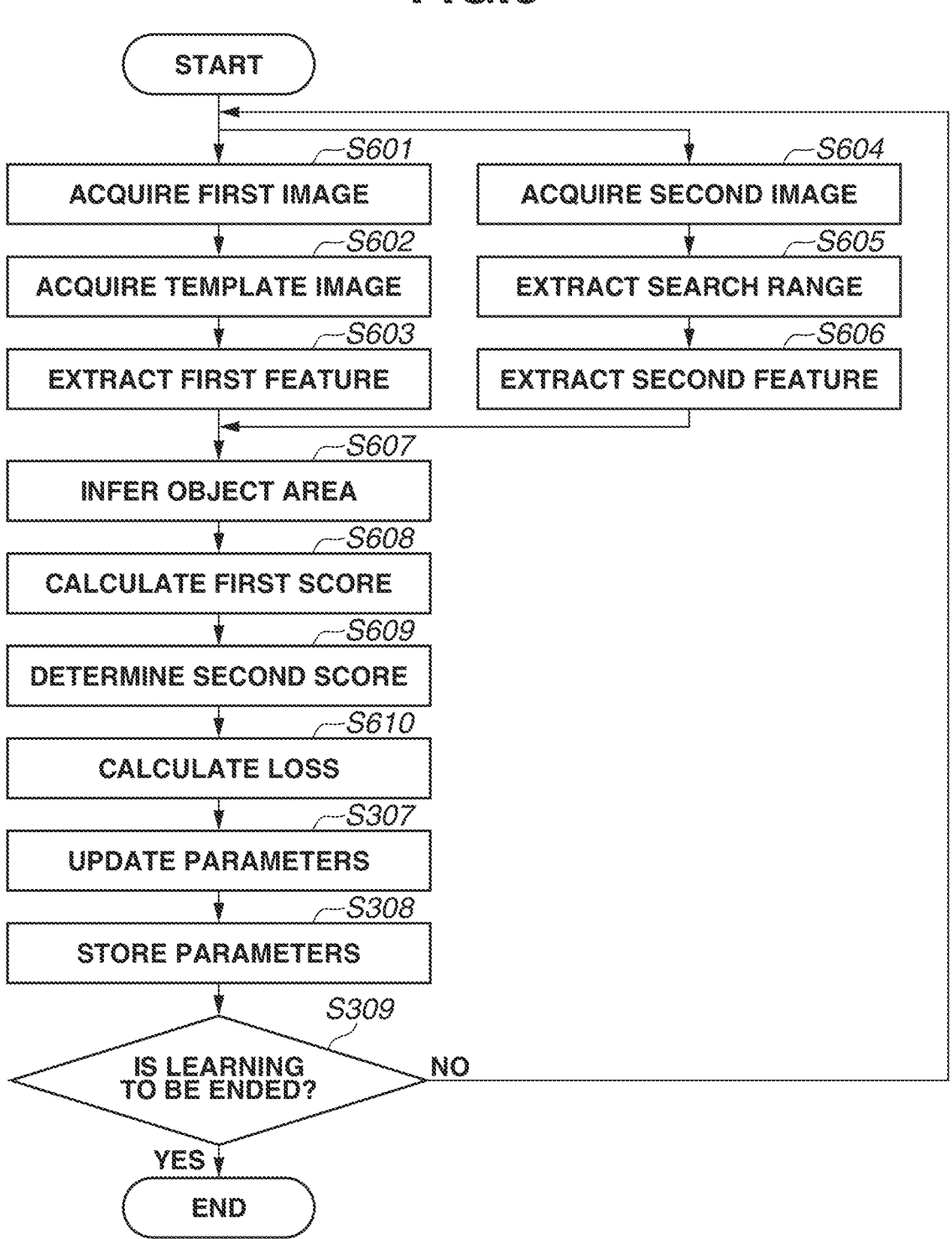
FIG. 6 is a flowchart illustrating a processing procedure to be executed by an information processing apparatus according to a second exemplary embodiment.

A hardware configuration example and a functional configuration example of an information processing apparatus 2 in learning processing are similar to those illustrated in FIGS. 1 and 2 according to the first exemplary embodiment. FIG. 6 is a flowchart illustrating processing to be executed by the information processing apparatus 2.

In step S601, the image acquisition unit 201 acquires a first image (image on which a template image is based)

where a tracking target is present. Further, the GT acquisition unit 202 acquires GT indicating a bounding box for the tracking target present in the template image. FIG. 7A illustrates an image of the template image. FIG. 7A also illustrates a first image 701 acquired by the image acquisition unit 201, a tracking target 703, and a bounding box 704 indicating the position and size of the tracking target. In tracking processing, the first image 701 is an image where the tracking target 703 is detected in the previous tracking processing.

In step S602, the image acquisition unit 201 extracts an image of a peripheral area of the tracking target 703 in the first image 701 based on the position and size of the tracking target 703 acquired by the GT acquisition unit 202 and resizes the extracted image, thereby acquiring the template cating objectness of the tracking target and an area indicated by the bounding box) based on cross-correlation between the feature (first feature) in the template image obtained in step S603 and the feature (second feature) in the search range obtained in step S606.

In step S608, the score calculation unit 204 calculates a score for the inferred object area based on Expression (1-1) in the same manner as in the first exemplary embodiment.

In step S609, the determination unit 205 calculates GT for objectness of the tracking target as represented by Expression (2-1). Score$_{Objectness}$ for an anchor point of interest is compared with Score$_{Objectness}$ for the peripheral area, and the objectness of the tracking target at an anchor point with Score$_{Objectness}$ higher than that of the peripheral area is increased.

$$(2-1)$$

$$\text{Objectness}_{GT} =$$

$$\begin{cases} 1 & \text{if } \text{Score}_{objectness} > Th \text{ and } \text{Score}_{objectness} > \sum_{k \in P} w_k \text{Score}^k_{objectness} \\ 0 & \text{if } \text{Score}_{objectness} < \text{Threshold} \\ \text{Score}_{objectness} & \text{else} \end{cases}$$

image. In tracking processing, a partial image including the tracking target can be extracted based on the result of the previous tracking processing. The partial image may be extracted with a constant multiple of the size of the tracking target based on the position of the tracking target 703. FIG. 7A also illustrates an example where an area 702 is extracted as a peripheral area of the tracking target 703.

In step S604, the image acquisition unit 201 acquires an image (second image) including a target area where the tracking target is searched for. For example, an image obtained at another time in the same sequence as the image selected in step S601 is acquired as the second image where the tracking target is searched for. FIG. 7B illustrates a second image 705 where a tracking target 707 is searched for, the tracking target 707, and a bounding box 708 for the tracking target 707. In tracking processing, the second image 705 is an image captured at timing different from the timing at which the first image is captured (e.g., an image captured after a predetermined period).

In step S605, the image acquisition unit 201 extracts an image corresponding to a peripheral area of the tracking target 707 in the template image based on the bounding box 708 for the tracking target 707 acquired by the GT acquisition unit 202, and resizes the extracted image. Specifically, the area corresponding to the second image 705 is set as a search range based on the position and size of the template image in the first image 701. For example, the image may be extracted with a constant multiple of the size of the tracking target 707 based on the position of the tracking target 707. FIG. 7B illustrates an example where a search target image 706 is extracted.

In step S603, the inference unit 203 inputs the template image obtained in step S602 to the learned neural network and obtains a feature (first feature) of the tracking target.

In step S606, the inference unit 203 inputs the search range image obtained in step S605 to the neural network and obtains another feature (second feature) included in the search range image.

In step S607, the inference unit 203 infers objectness of the tracking target in the second image and a bounding box for the tracking target (object area including a score indi- In step S610, the loss calculation unit 306 calculates a loss for the output result from the neural network in the same manner as in the first exemplary embodiment.

As represented by Expression (2-1), GT for objectness is calculated using not only the score for objectness at the anchor of interest but also the score for objectness in the peripheral area, thereby making it possible to easily obtain anchors of bounding boxes with higher accuracy than anchors for the peripheral area in inference processing.

The exemplary embodiments of the present disclosure can also be implemented by executing the following processing. That is, software (program) for implementing functions according to the above-described exemplary embodiments is supplied to a system or an apparatus via a network for data communication or various storage media. Further, a computer (or a CPU, a micro processing unit (MPU), etc.) in the system or the apparatus reads out and executes the program.

The program may be recorded on a computer-readable recording medium to be provided.

A model learned by machine learning may be used for processing in place of a face detection unit 102 or the like in the above-described processing units. In this case, for example, a plurality of combinations of pieces of input data to be input to the processing unit and output data to be output from the processing unit is prepared as learning data, and knowledge is obtained by machine learning using the learning data. Based on the obtained knowledge, a learned model for outputting output data corresponding to input data as a result is generated. The learned model can be formed of, for example, a neural network model. The learned model operates as a program for performing processing equivalent to the processing unit in cooperation with a CPU, a graphics processing unit (GPU), or the like, thereby implementing the processing of the processing unit. The above-described learned model may be updated, as needed, after predetermined processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-158440, filed Sep. 28, 2021, which is hereby incorporated by reference herein in its entirety.

What is claimed is:

1. An information processing apparatus configured to learn objectness of an object in an image, the information processing apparatus comprising:
    at least one processor; and
    at least one memory having stored thereon instructions which, when executed by the at least one processor, cause the information processing apparatus at least to:
    acquire an image;
    acquire Ground Truth (GT) data including at least an object area where an object in the acquired image is present;
    infer a plurality of candidate areas for the object in the image and a first score indicating objectness for the candidate area based on a learning model;
    determine a second score indicating objectness for the object area based on a degree of overlap between a candidate area corresponding to a position of interest in the image among the plurality of the inferred candidate areas and an area included in the acquired GT data, and a degree of overlap between another candidate area corresponding to a peripheral area around the position of interest in the image and an area included in the acquired GT data; and
    update a parameter for the learning model based on a loss value calculated based on the second score and the inferred first score indicating the objectness for the candidate area.

2. The information processing apparatus according to claim 1, wherein the second score is determined based on a similarity between the candidate area and the object area in the acquired GT data.

3. The information processing apparatus according to claim 2, wherein the second score is determined based on a degree of overlap between the candidate area and the object area in the acquired GT data.

4. The information processing apparatus according to claim 3,
    wherein the second score is determined based on a degree of overlap between the candidate area corresponding to a position of interest in the image and the object area in the acquired GT data and a degree of overlap between another candidate area corresponding to a peripheral area of the position of interest in the image and the object area in the acquired GT data.

5. The information processing apparatus according to claim 4, wherein in a case where the degree of overlap between the candidate area corresponding to the position of interest in the image and the object area in the acquired GT data is greater than the degree of overlap between the other candidate area corresponding to the peripheral area of the position of interest in the image and the object area in the acquired GT data, the second score for the candidate area corresponding to the position of interest is determined to be greater than the second score for the other candidate area corresponding to the peripheral area of the position of interest in the image.

6. An information processing apparatus comprising:
    at least one processor; and
    at least one memory having stored thereon instructions which, when executed by the at least one processor, cause the information processing apparatus at least to:
    acquire data indicating a Ground Truth (GT) area including a position of an object in a target image;
    estimate a plurality of candidate areas where the object is likely to be present in the target image and a first score indicating a possibility of presence of the object in the candidate area by inputting the target image to a learning model for estimating an object area including the position of the object present in the target image;
    calculate a second score indicating the possibility of presence of the object in the candidate area based on a degree of overlap between a candidate area corresponding to a position of interest in the image among the plurality of the estimated candidate areas and an area included in the acquired GT data, and a degree of overlap between another candidate area corresponding to a peripheral area around the position of interest in the image and the acquired data;
    calculate a loss for the learning model based on the second score and the estimated candidate area; and
    update a parameter for the learning model based on the calculated loss,
    wherein the learning model is learned by updating the candidate area having the second score greater than or equal to a predetermined value as the GT area in the target image.

7. The information processing apparatus according to claim 6, wherein the second score is calculated based on a degree of overlap between the candidate area and the GT area.

8. An information processing method for learning objectness of an object in an image, the information processing method comprising:

acquiring an image;

acquiring Ground Truth (GT) data including at least an object area where an object in the acquired image is present;

inferring a plurality of candidate areas for the object in the image and a score indicating objectness for the candidate area based on a learning model;

determining a score indicating objectness for the object area based on a degree of overlap between a candidate area corresponding to a position of interest in the image among the plurality of the inferred candidate areas and an area included in the acquired GT data, and a degree of overlap between another candidate area corresponding to a peripheral area around the position of interest in the image and an area included in the acquired GT data; and updating a parameter for the learning model based on a loss value calculated based on the determined score and the score indicating objectness for the inferred candidate area.

9. A non-transitory computer-readable storage medium storing a program for causing a computer to execute an information processing method comprising:

acquiring an image;

acquiring Ground Truth (GT) data including at least an object area where an object in the acquired image is present;

inferring a plurality of candidate areas for the object in the image and a score indicating objectness for the candidate area based on a learning model;

determining a score indicating objectness for the object area based on a degree of overlap between a candidate area corresponding to a position of interest in the image among the plurality of the inferred candidate areas and an area included in the acquired GT data, and a degree of overlap between another candidate area corresponding to a peripheral area around the position of interest in the image and an area included in the acquired GT data; and updating a parameter for the learning model based on a loss value calculated based on the determined score and the score indicating objectness for the inferred candidate area.

10. The information processing apparatus according to claim 1, wherein the instructions, when executed, further cause the information processing apparatus to:

calculate a first loss relating to the objectness, based on the first score and the second score;

calculate a second loss, based on the inferred candidate area and the GT data; and update the parameter, based on an integrated loss obtained from the first loss and the second loss.

\* \* \* \* \*